S. E. HARRINGTON.
Seed-Planter.

No. 42,370. Patented Apr. 19, 1864.

Witnesses:
Andrew Whiteley
Thomas J Gardner

Inventor:
Samuel E Harrington
By his atty
R. D. O. Smith

UNITED STATES PATENT OFFICE.

S. E. HARRINGTON, OF GREENFIELD, MASSACHUSETTS.

IMPROVEMENT IN CONVERTIBLE PLANTER AND CULTIVATOR.

Specification forming part of Letters Patent No. 42,370, dated April 19, 1864.

*To all whom it may concern:*

Be it known that I, S. E. HARRINGTON, of the town of Greenfield, in the county of Franklin and State of Massachusetts, have invented a new and Improved Machine for Seeding and Cultivating; and I do hereby declare the following to be a full, clear, and exact description of the same, reference being had to the accompanying drawings, in which—

Figure 1:
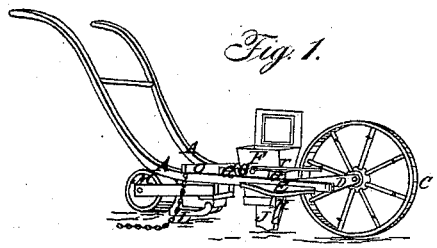
Figure 2:
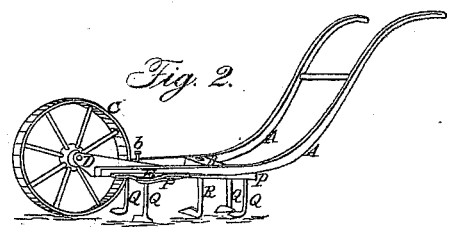
Figure 3:
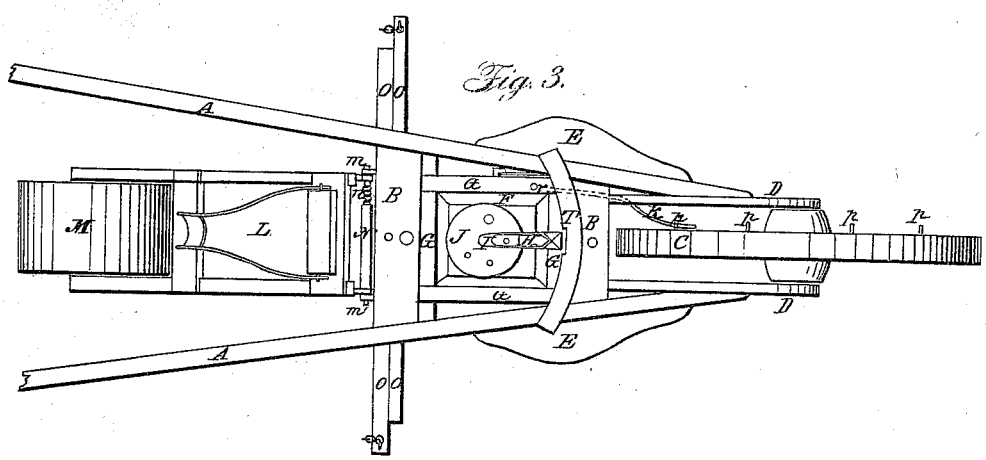
Figures 4, 6:
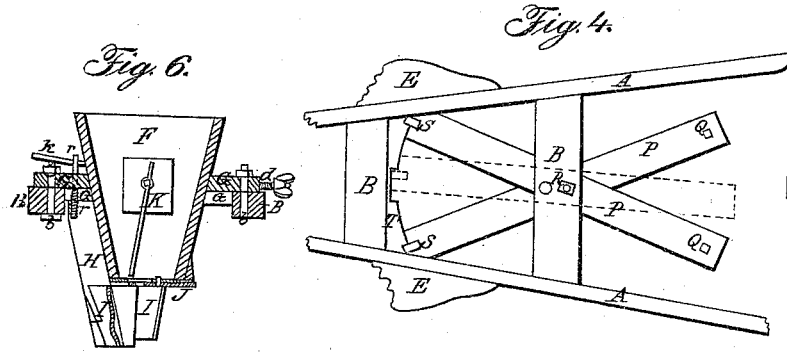
Figure 5:
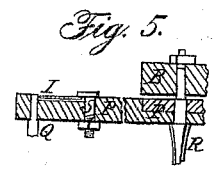

Figure 1 is a perspective view of my machine as used for seeding. Fig. 2 is a perspective view of the same as used for cultivating. Fig. 3 is a bottom plan of the machine, showing the arrangement of seed-hopper, &c. Fig. 4 is a top plan of the machine, showing the method of attaching the cultivator. Fig. 5 is a longitudinal vertical section of the front end of one of the cultivator-bars, showing the set-bolt. Fig. 6 is a vertical longitudinal section of the seed-hopper.

The nature of my invention consists in so constructing a machine to be propelled by manual power that it may be readily converted and efficiently used either as a seeding-machine or as a cultivator.

The same letters refer to the same parts in all the figures.

A A are the side bars of the main frame, and may be bent at their rear ends, so as to serve as handles for the purpose of guiding or propelling the machine.

B B are the cross-pieces of the main frame.

C is the wheel.

D D are the bearing-pieces, which support the frame upon the axle.

E E are projecting side pieces to push aside standing plants which might otherwise be injured by the passage of the machine or obstruct its operation.

F is the seed box or hopper. The pieces G G G G form a frame which surrounds and is attached to the hopper F for the purpose of readily attaching said hopper to the main frame.

H is a post attached to the front side of the hopper, the foot or lower end making the furrow in which the seed is planted.

I is the metallic shoe upon the foot of the post H, the rear portion forming the chute through which the seed descends to the furrow.

J is a disk pivoted to the under side of the bottom of the hopper, and provided with a series of holes of different sizes to adapt the machine to seeds of different kinds, or to plant different quantities.

K is an adjustable vibrating agitator, operated by means of the lever $k$, which is raised by the pins $p$ in the spokes of the wheel C, and brought down again by a spring, $r$.

L is the coverer.

M is the roller suspended in a suitable frame, and attached to the main frame of the machine by the spring-bolt N.

O O are two adjustable rods or arms projecting sidewise from the machine, and from the outer ends of which chains or other suitable devices may be suspended for the purpose of marking the next row.

P P are two bars, to which the cultivators are attached. They are "halved" and cross at their center, through which the tang of the center cultivator, R, passes and secures them to the main frame. The forward ends of the bars P are each provided with the set-bolt S, the lip on the head of which passes over the edge of the plate T, and thereby holds the bars P securely at any point it may be desired to fix them, thus rendering the machine adjustable to the cultivation of a greater or less width, as may be desired.

The operation of my machine is as follows: In order to prepare it for use as a seeding-machine, the hopper is placed in its proper position between the cross-bars B B of the main frame, the bolts $b$ slipping through their appropriate holes and being secured by their nuts. The frame containing the roller M and coverer L is attached by passing the projecting end of the bolt N, upon which the spring $n$ is wound, through one of the staples or eyes, $m$, and thereby pushing the bolt so as to compress the said spring. Its other end may be brought back to allow it to pass through the other staple or eye, $m'$, and the roller-frame is thereby securely and with great facility attached to the machine. The arms O are provided with a series of holes, either of which the bolt $d$ may pass through and be secured by its nut, so that they may be made to project a greater or less distance on either side, as it may be desirable to make the rows near or far apart. When this has been done the lever $k$ will be found to extend forward beside the wheel C, and the shoe I and post H will penetrate the ground, and as the machine is pushed forward will make the required furrow. As the wheel C revolves each of the pins $p$ in turn raises the lever $k$, which is brought suddenly down again upon being released from the pin $p$ by the spring $r$. This causes the agitator K to vibrate quickly across the mouth of the orifice through the bottom of the hopper, and thereby secure a uniform and ready flow of the seed. The coverer L draws the earth displaced by H back into the furrow, and it is pressed down by the roller M, and the seed is properly covered.

To fit the machine for cultivating, the hopper is removed, together with the roller and its frame, and the cultivators are attached by passing the tang of the center tooth, R, through the centers of the bars P and through its hole in the rear cross-piece B and securing it by a nut; but before the nut is "set down tight" the front ends of the bars P are brought together, as shown by the red lines, when the lip on one of the set-bolts S may be passed through the cut-away portion of the plate T and slipped onto said plate and around far enough to allow the other set or clamping bolt S to be passed onto the plate in the same manner, when the bars P may be adjusted so that the cultivators will cut any required width. The nuts on the clamping-bolts S and on the tang of the center tooth may now be set down hard, and the machine is ready for use. At other times the machine, when divested of the seeding appliances and the cultivators, may be very conveniently used as a wheelbarrow, and, if desired, a pair of short legs may be added for the purpose of rendering it more convenient for such use.

Having described my invention, what I claim as new, and desire to secure by Letters Patent, is—

1. In combination with the main frame of a machine which may be used as a seeding-machine or for other purposes, the hopper, agitator, measuring device, chute, drill, and markers, when constructed in such a manner that they may all be removed from said main frame by one and the same operation, substantially as set forth, and for the purpose described.

2. The combination and arrangement of the hopper F, frame G, agitator K, lever $k$, and spring $r$, post H, shoe I, disk J, and markers O, constructed and operating substantially as described.

3. In combination with the main frame and drag-bars of a seeding-machine or cultivator, the spring-bolt coupling N, constructed and operating substantially as described.

4. In combination with the main frame of a machine which may be used as a seeding-machine or for other purposes, and provided with a plate, T, the cultivator-bars P P, when crossed at their middle and provided with clamping-bolts S S, substantially as described.

5. In combination with the main frame of a machine which may be used as a seeding-machine or for other purposes, the fenders E E, substantially as described, and for the purpose set forth.

SAMUEL E. HARRINGTON.

Witnesses:
NOAH S. WELLS,
GEO. GRENNELL.